(12) United States Patent
Sakai et al.

(10) Patent No.: US 9,075,737 B2
(45) Date of Patent: Jul. 7, 2015

(54) VERIFICATION DEVICE, VERIFICATION METHOD AND COMPUTER PROGRAM PRODUCT

(71) Applicant: KABUSHIKI KAISHA TOSHIBA, Minato-ku, Tokyo (JP)

(72) Inventors: Yumiko Sakai, Kanagawa (JP); Yusuke Doi, Kanagawa (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 160 days.

(21) Appl. No.: 14/025,520

(22) Filed: Sep. 12, 2013

(65) Prior Publication Data

US 2014/0122945 A1 May 1, 2014

(30) Foreign Application Priority Data

Oct. 26, 2012 (JP) ................................. 2012-237244

(51) Int. Cl.
| G06F 11/00 | (2006.01) |
| G06F 11/10 | (2006.01) |
| G06F 17/22 | (2006.01) |
| G06F 17/30 | (2006.01) |
| G06F 17/27 | (2006.01) |
| G06F 11/263 | (2006.01) |

(52) U.S. Cl.
CPC ............ G06F 11/10 (2013.01); G06F 17/2247 (2013.01); G06F 17/30911 (2013.01); G06F 17/2765 (2013.01); G06F 11/263 (2013.01)

(58) Field of Classification Search
CPC ............ G06F 17/2247; G06F 17/2765; G06F 17/30911; G06F 17/3092; G06F 9/4448
See application file for complete search history.

(56) References Cited

U.S. PATENT DOCUMENTS

| 2006/0294120 A1* | 12/2006 | Li et al. .......................... 707/100 |
| 2007/0282573 A1* | 12/2007 | Fritz et al. ......................... 703/2 |
| 2009/0183067 A1* | 7/2009 | Fablet ............................ 715/234 |

(Continued)

FOREIGN PATENT DOCUMENTS

JP    2007-226813 A    9/2007

OTHER PUBLICATIONS

Efficient SML Interchange (EXI) Format 1.0; http://www.w3.org/TR/exi/#InformedGrammars; Dec. 21, 2012; 24 pages.

(Continued)

*Primary Examiner* — Charles Ehne
(74) *Attorney, Agent, or Firm* — Ohlandt, Greeley, Ruggiero & Perle, L.L.P.

(57) ABSTRACT

According to an embodiment, a verification device includes an encoding rule generating unit, a test data generating unit, an error rule generating unit, a determined value generating unit, and a verifying unit. The encoding rule generating unit is configured to generate an encoding rule based on a definition document for a structured document. The test data generating unit is configured to generate test data in which all combinations of state transitions are expressed in bits in accordance with an encoding rule. The error rule generating unit is configured to add an error rule to the encoding rule. The determined value generating unit is configured to generate a determined value indicating whether a transition is normal. The verifying unit is configured to determine that a decoding device is not normal when the determined value and an output determined value resulting from inputting the test data to the decoding device are different.

8 Claims, 9 Drawing Sheets

(56) References Cited

U.S. PATENT DOCUMENTS

| | | | |
|---|---|---|---|
| 2009/0210783 A1* | 8/2009 | Bellessort | 715/234 |
| 2010/0083101 A1* | 4/2010 | Denoual et al. | 715/242 |
| 2010/0153837 A1* | 6/2010 | Bellessort et al. | 715/234 |
| 2010/0211867 A1* | 8/2010 | Heuer et al. | 715/234 |
| 2011/0010614 A1* | 1/2011 | Fablet et al. | 715/234 |
| 2012/0254231 A1 | 10/2012 | Doi | |
| 2012/0254724 A1 | 10/2012 | Doi | |
| 2012/0254725 A1 | 10/2012 | Doi | |
| 2013/0103721 A1* | 4/2013 | Doi et al. | 707/802 |
| 2013/0104033 A1 | 4/2013 | Doi et al. | |

OTHER PUBLICATIONS

Efficient XML Interchange (EXI) Format 1.0; http:www.w3.org/TR/exi@InformedGrammars; Dec. 21, 2012; 24 pages.

* cited by examiner

```
<?xml version="1.0" encoding="utf-8"?>
<xs:schema xmlns:xs="http://www.w3.org/2001/XMLSchema"
    xmlns="http://www.sample.com/sample"
    targetNamespace="http://www.sample.com/sample">

<xs:element name="sample" type="sample"/>

<xs:complexType name="sample">
    <xs:sequence>
        <xs:element name="id" maxOccurs="unbound" type="xs:integer"/>
        <xs:element name="description" minOccurs="0" maxOccurs="1" type="xs:string"/>
    </xs:sequence>
</xs:complexType>

</xs:schema>
```

| STATE \ NEXT STATE | Element1 | Element2 | End |
|---|---|---|---|
| Start | StartElement (id) $0_0$ | - | - |
| Element1 | StartElement (id) $0_2$ | StartElement (description) $1_2$ | EndElement $2_2$ |
| Element2 | - | - | EndElement $0_0$ |

| STATE \ NEXT STATE | Element1 | Element2 | End | Error |
|---|---|---|---|---|
| Start | StartElement (id) $0_0$ | - | - | - |
| Element1 | StartElement (id) $0_2$ | StartElement (description) $1_2$ | EndElement $2_2$ | $3_2$ |
| Element2 | - | - | EndElement $0_0$ | - |

FIG.8

| TEST STREAM ID | BIT STREAM |
|---|---|
| 1 | 00000000... |
| 2 | 00000000... |
| ⋮ | ⋮ |
| N | 00000000... |

FIG.9

| TEST STREAM ID | BIT STREAM | NORMAL STREAM/ABNORMAL STREAM | INFORMATION ON XML DOCUMENT BEFORE ENCODING | NUMBER OF BITS |
|---|---|---|---|---|
| 1 | 00000000... | NORMAL STREAM | <sample... | 128 bit |
| 2 | 00000000... | NORMAL STREAM | <sample... | 136 bit |
| ⋮ | ⋮ | ⋮ | ⋮ | ⋮ |
| N | 00000000... | ABNORMAL STREAM | <sample... | 32 bit |

FIG.10

| TEST STREAM ID | BIT STREAM | DECODING | XML DOCUMENT AS DECODING RESULT | DECODING END POSITION |
|---|---|---|---|---|
| 1 | 00000000... | ALLOWED | <sample... | 128 bit |
| 2 | 00000000... | ALLOWED | <sample... | 136 bit |
| ⋮ | ⋮ | ⋮ | ⋮ | ⋮ |
| N | 00000000... | NOT ALLOWED | <sample... | 32 bit |

| TEST STREAM IN PROCESS OF GENERATION | NUMBER OF BITS | NUMBER OF TRANSITIONS | BIT WIDTH |
|---|---|---|---|
| 00000000... | 125 bit | 5 | 3 |

FIG.15

VERIFICATION DEVICE, VERIFICATION METHOD AND COMPUTER PROGRAM PRODUCT

CROSS-REFERENCE TO RELATED APPLICATION

This application is based upon and claims the benefit of priority from Japanese Patent Application No. 2012-237244, filed on Oct. 26, 2012; the entire contents of which are incorporated herein by reference.

FIELD

Embodiments described herein relate generally to a verification device, a verification method and a computer program product.

BACKGROUND

There has been an increasing trend in the data amount of structured documents in XML and the like, and the structured documents are thus not suitable for high-speed data processing and processing handling a large amount of XML documents. Efficient XML Interchange (EXI) is therefore proposed as a standard for efficient and high-speed data processing. The EXI converts an XML document to an EXI stream that is a binarized representation according to the XML schema. This can contribute to efficient data communication and processing since binarized data are dramatically reduced in data volume.

Furthermore, for actually checking data binarized as described above by a user, the user inputs the EXI stream to a decoding device having the same logic as that of a state machine used to binarize the XML document and the original XML document is output therefrom. Since the output XML document is written in a human-readable format, the user can thus check the content thereof.

In order to properly handle a structured document converted to an EXI stream as described above, it is necessary that the decoding device work properly. It is thus desirable to conduct a test using an EXI stream generated from an XML document as input to check whether or not decoding is successful before the decoding device is put into operation. Since, however, there are infinite patterns of input XML documents, the operation of a decoding device cannot be guaranteed by simply using an EXI stream generated from an XML document as input as test data.

A verification device according to an embodiment includes a receiving unit, an encoding rule generating unit, a test data generating unit, an error rule generating unit, a determined value generating unit, and a verifying unit. The encoding rule generating unit generates an encoding rule defining state transitions on the basis of a definition document.

The test data generating unit generates test data according to the encoding rule. The error rule generating unit adds an error rule to the encoding rule when there is a difference between the number of state transitions and the maximum number that can be expressed by the number of bits necessary for expressing the number of transitions, the error rule corresponding to the difference. The determined value generating unit generates a determined value indicating whether a transition is a normal transition or an abnormal transition for each of the combinations of the state transitions in accordance with the encoding rule.

The verifying unit compares an output determined value resulting from inputting the test data to the decoding device with the determined value, and determines that the decoding device is not normal when the output determined value and the determined value are different from each other.

DETAILED DESCRIPTION

According to an embodiment, a verification device includes a receiving unit, an encoding rule generating unit, a test data generating unit, an error rule generating unit, a determined value generating unit, and a verifying unit. The receiving unit is configured to receive an input of a definition document that defines a grammar of a structured document. The encoding rule generating unit is configured to generate an encoding rule based on the received definition document. The encoding rule defines state transitions used for encoding the structured document into binary data. The test data generating unit is configured to generate test data in which all combinations of the state transitions are expressed in bits in accordance with the encoding rule. The test data is to be input to a decoding device that decodes the encoded structured document. The error rule generating unit is configured to add an error rule to the encoding rule when there is a difference between the number of state transitions and a maximum number that is expressed by the number of bits necessary for expressing the number of transitions. The error rule corresponds to the difference. The determined value generating unit is configured to generate a determined value that indicates whether a transition is a normal transition or an abnormal transition for each of the combinations of the state transitions, in accordance with the encoding rule. The verifying unit is configured to compare the determined value with an output determined value for the combination of the state transitions corresponding to the determined value, the output determined value resulting from inputting the test data to the decoding device and indicating whether a transition is a normal transition or an abnormal transition, and determine that the decoding device is not normal when the determined value and the output determined value and are different from each other.

First Embodiment

Figure 1:
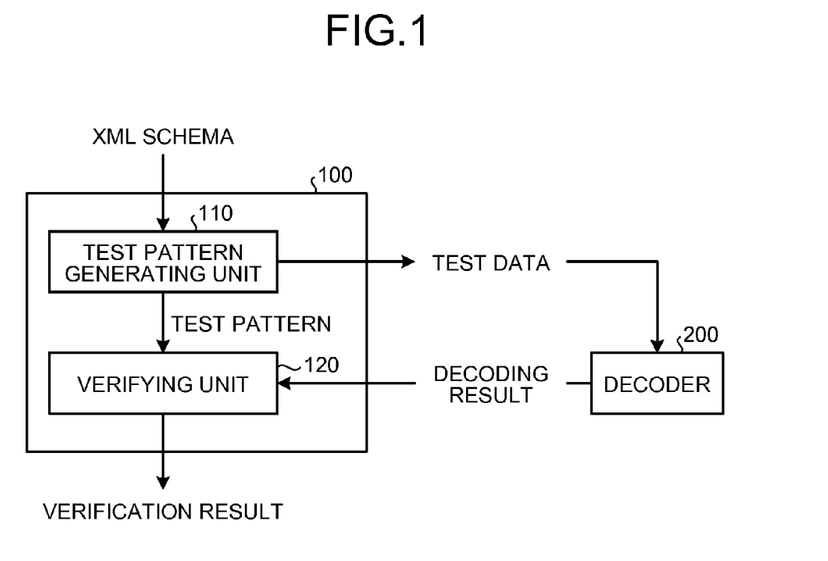
FIG. 1 is a block diagram illustrating a functional configuration of a verification device according to a first embodiment.

An example in which a verification device 100 is exemplified as an embodiment will be described below with reference to the drawings. As illustrated in FIG. 1, the verification device 100 includes a test pattern generating unit 110 and a verifying unit 120. The test pattern generating unit 110 generates a test stream, which is data for test, and a test pattern on the basis of an input XML schema. The test stream is input to a decoder 200 that is a decoding device while the test pattern is input to the verifying unit 120. The verifying unit 120 receives as input a result indicating whether or not data obtained by decoding the data stream input to the decoder 200 are normal, determines whether or not the operation of the decoder 200 is normal on the basis of whether or not determined values contained in the result from the decoder 200 and in the test pattern match each other.

Figure 3:
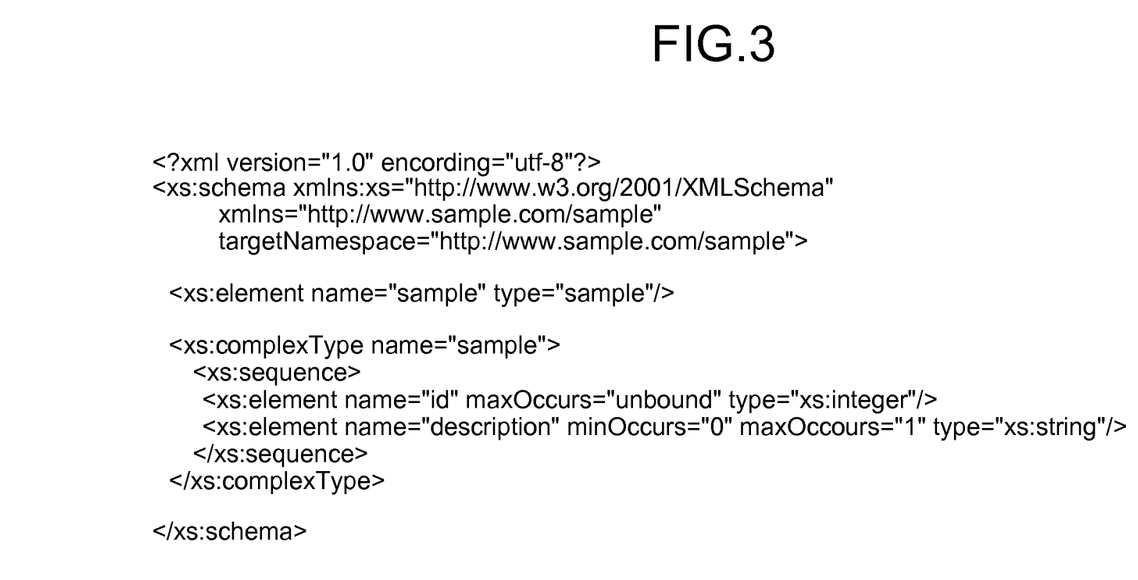
FIG. 3 is an example of an XML schema used in the verification device according to the first embodiment.

FIG. 3 is an example of the XML schema in the present embodiment. An XML schema describes syntax rules for XML documents, and the XML schema written in FIG. 3 defines an "element" named "sample", which contains an integer type element "id" whose number of occurrences is not less than 1 and a character type element "description" whose number of occurrences is from 0 to 1 in this order.

Figure 2:
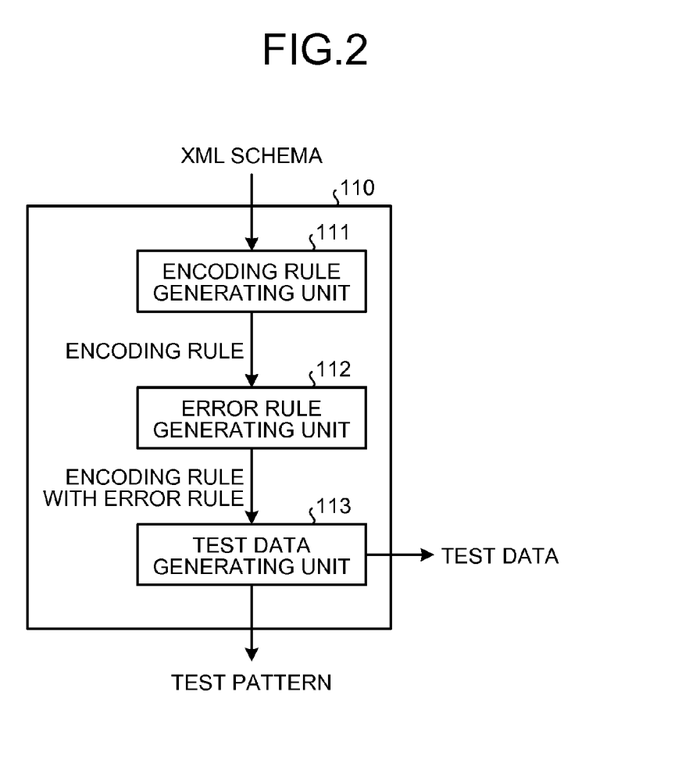
FIG. 2 is a block diagram illustrating details of the functional configuration of the verification device according to the first embodiment.

FIG. 2 is a diagram illustrating a detailed functional configuration of the test pattern generating unit 110 described above. As illustrated in FIG. 2, the test pattern generating unit 110 includes an encoding rule generating unit 111, an error rule generating unit 112, and a test data generating unit 113. The encoding rule generating unit 111 receives input of the XML schema and generates an encoding rule defining state transitions to be used for encoding an XML document into binary data on the basis of the XML schema. Thus, the encoding rule generating unit 111 also serves as a receiving unit.

Figure 4:
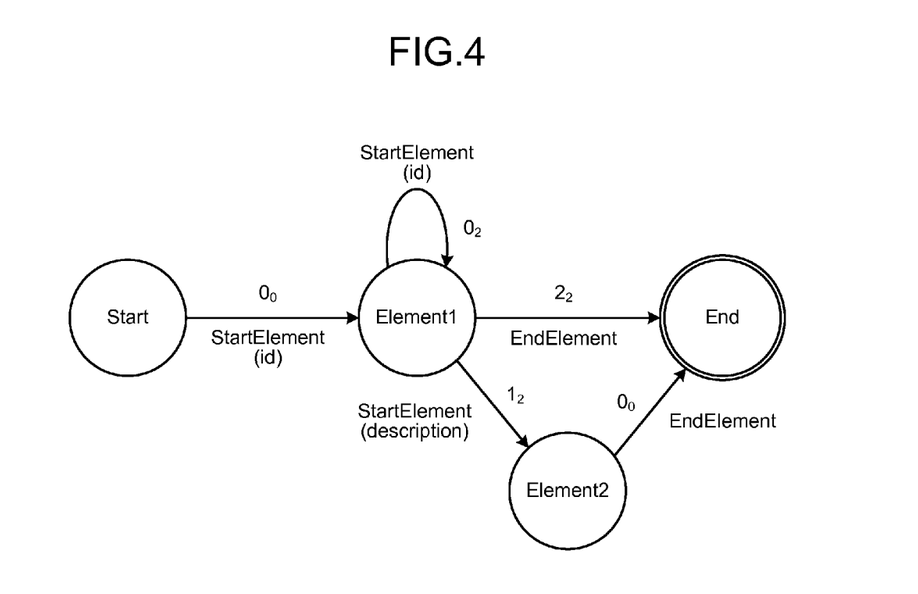
FIG. 4 is an example of state transitions in the verification device according to the first embodiment.
Figure 5:
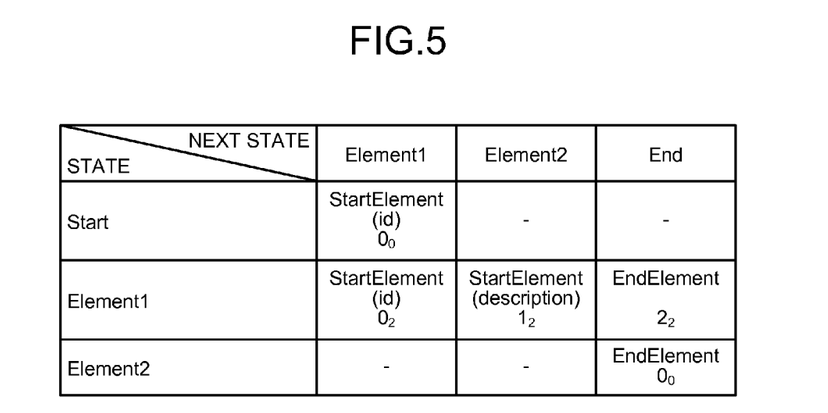
FIG. 5 is a table illustrating state transitions in the verification device according to the first embodiment.

FIG. 4 is a diagram illustrating an example of the generated encoding rule, and FIG. 5 illustrates the encoding rule in the form of a state transition table. The method for generating an encoding rule from an XML schema can be a method defined by the existing EXI standard. In the encoding rule illustrated in FIG. 4, "Element1" and "Element2" that are circled represent states after occurrence of events and arrows represent transitions. For example, "StartElement(id)" means that an event of transition named "StartElement(id)" occurs when there is a tag to which an element named "id" is assigned. Furthermore, numerals such as "$0_0$" assigned to the respective transitions represent compact IDs. Big numerals of the compact IDs are integers different from one another starting from 0 respectively assigned to events allowing transitions from a certain state. Specifically, FIG. 4 illustrates that one transition "0" can take place from "Start", three transitions "0", "1" and "2" can take place from "Element1", and one transition "0" can take place from "Element2". Subscript numerals represent bit widths of the transition code. The bit widths are determined by the number of possible transitions from a certain state. For example, "$_2$" assigned to events deriving from "Element1" suggests that four transitions can be distinguished from one another. When a structured document is supplied to the encoding rule defining the state transitions, transitions are made according to tags in the structured document and a compact ID is given as a value to be encoded each time a transition is made. Thus, conversely, the decoder 200 receives a compact ID as input and outputs an event (transition). For example, if $1_2$ is input in the state of "Element1", an event named "StartElement(description)" is output.

Figure 6:
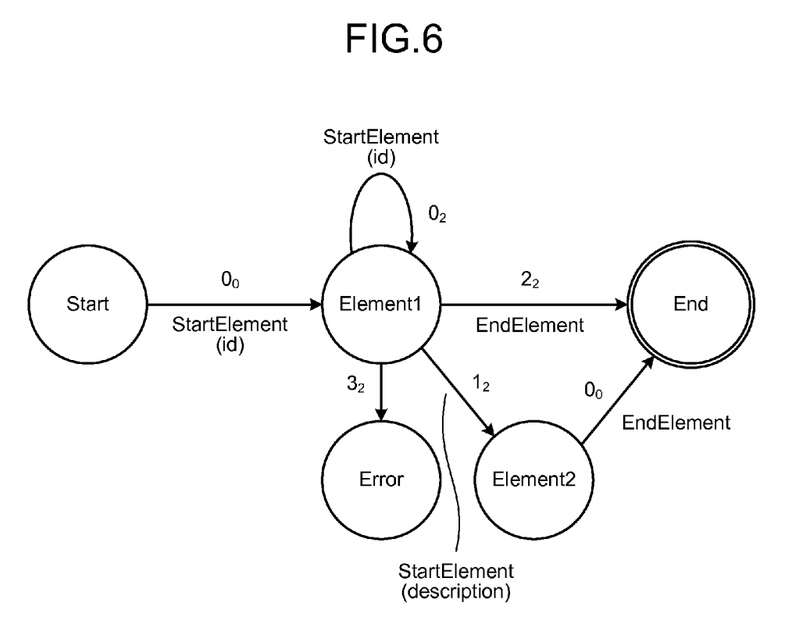
FIG. 6 is an example in which an error transition is added to the state transitions in the verification device according to the first embodiment.
Figure 7:
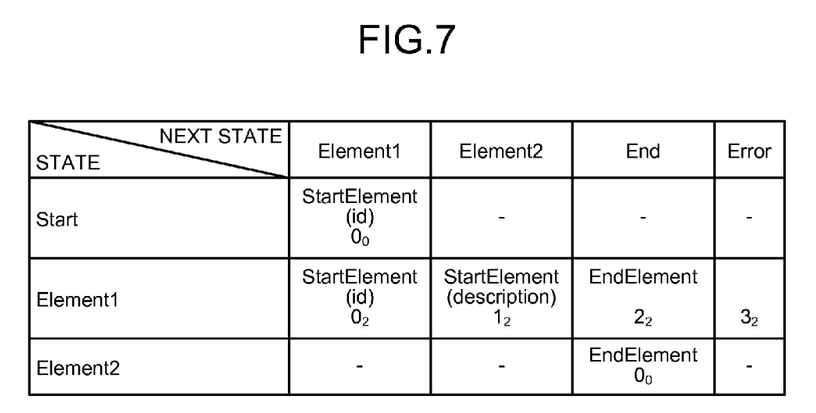
FIG. 7 is a state transition table in which an error transition is added to the state transitions in the verification device according to the first embodiment.

Next, the description refers back to FIG. 2, where the error rule generating unit 112 receives the generated encoding rule as input, attaches an error rule thereto and outputs an encoding rule with an error rule. Details of the error rule will be described with reference to FIGS. 6 and 7. As illustrated in FIGS. 6 and 7, a state named "Error" to which transition is made from "Element1" is added to state transitions, and a compact ID $3_2$ is assigned to the transition. There are three possible transitions from the state of "Element1", that is, the number of correct transitions according to the XML schema is three. In the meantime, since the bit width assigned to the transitions from "Element1" is 2, four numerals 00, 01, 10 and 11 are possible. In decoding at the decoder 200, a stream corresponding to a predetermined bit width is read and an event associated with the value thereof is determined. The decoder 200 may thus receive $3_2$ as input in the state of "Element1", but no transition associated with this compact ID is defined. Accordingly, in order to verify whether the decoder 200 can correctly determine the input $3_2$ that is originally an error according to the XML schema, it is necessary that test data associated with the compact ID $3_2$ can be generated. In the present embodiment, a transition to "Error" is therefore added as an error rule to the encoding rule.

Figure 11:
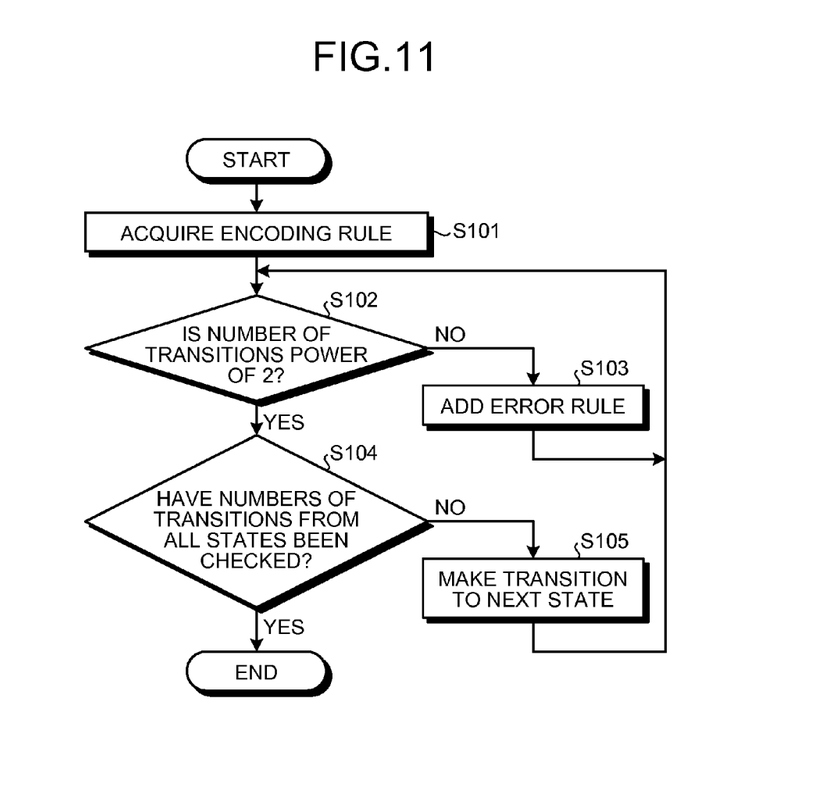
FIG. 11 is a flowchart illustrating a flow of processing for adding an error transition to state transitions in the verification device according to the first embodiment.

A flow of processing for adding an error rule will be described below with reference to the flowchart of FIG. 11. First, the error rule generating unit 112 acquires the encoding rule (step S101). When the encoding rule is acquired, the encoding rule is in the state in which "Start" is selected. Subsequently, the error rule generating unit 112 determines whether or not the number of possible transitions that can be made from the current state is a power of 2 (step S102). If it is determined that the number of possible transitions is not a power of 2 (step S102: No), that is, if the number of possible transitions is not 1, 2, 4, 8 . . . , an error rule is added, a compact ID is set to a value obtained by adding 1 to the maximum value of the current transitions, and the bit width is set to the value assigned to the same transitions (step S103). The number of transitions is increased by 1 as a result of adding the error rule, and the processing is returned to step S103 and repeated until the number of transitions becomes a power of 2. If, on the other hand, it is determined that the number of transitions is a power of 2 (step S102: Yes), the error rule generating unit 112 determines whether or not the number of transitions has been checked for all the states (step S104). If the number of transitions has been checked for all the states (step S104: Yes), the processing is terminated. If the number of transitions has not been checked for all the states (step S104: No), a transition is made to a state for which the number of transitions has not been checked and the processing from Step S102 is repeated (step S105). Since only the number of transitions from "Element1" is not a power of 2 among the state transitions illustrated in FIGS. 6 and 7, the transition of "Error" is generated and added as an error rule.

Figure 8:
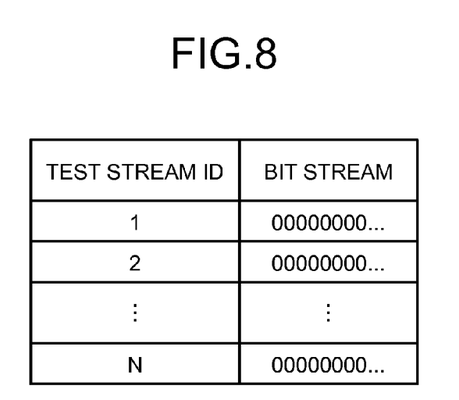
FIG. 8 is an example of a test stream according to the first embodiment.
Figure 9:
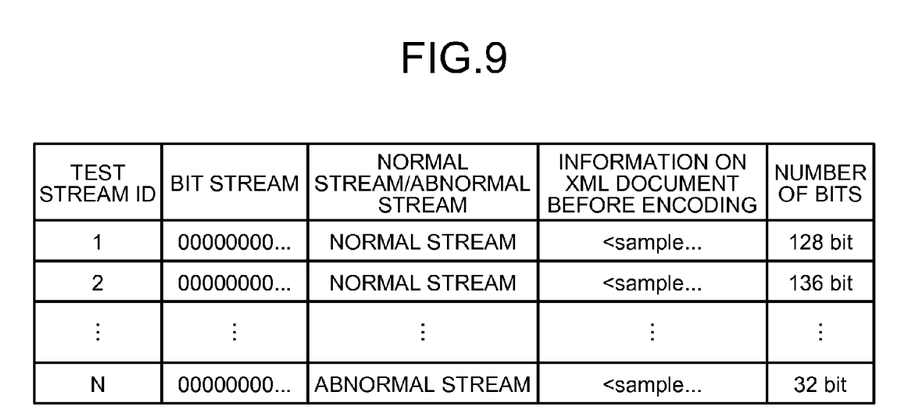
FIG. 9 is an example of a test pattern according to the first embodiment.
Figure 12:
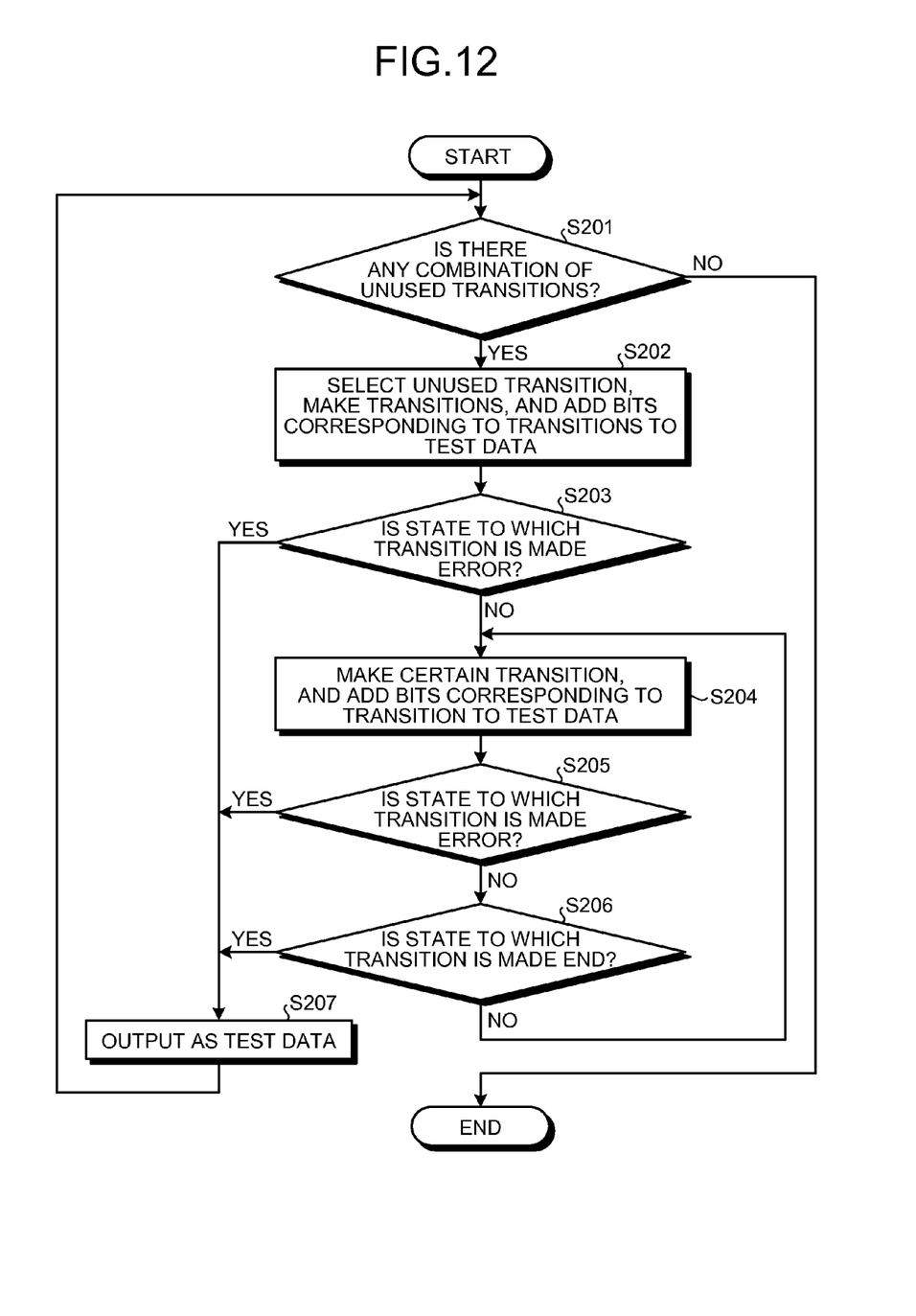
FIG. 12 is a flowchart illustrating a flow of processing for generating a test stream in the verification device according to the first embodiment.

Subsequently, the description refers back to FIG. 2, where the test data generating unit 113 receives the coding rule with the error rule as input and outputs test data to be input to the decoder 200 and a test pattern to be input to the verifying unit 120. FIG. 8 illustrates an example of the test data, and FIG. 9 illustrates an example of the test pattern. The test data is generated as one bit stream for a combination of transitions from Start to End or from Start to Error. A flow of processing for generating the test data and the test pattern will be described below with reference to FIG. 12. As illustrated in FIG. 12, the test data generating unit 113 first determines whether or not there is an unused transition in the input encoding rule with the error rule (step S201). If it is determined that there is no unused transition (step S201: No), the processing is terminated. If, on the other hand, it is determined that there is a combination of unused transitions (step S201: Yes), the test data generating unit 113 selects one from the unused transitions, makes the transition from "Start" and adds bits corresponding to the transition to the test data (step S202). The bits added in this process are obtained by encoding the compact ID assigned to the transition. In this process, the test data generating unit 113 determines whether or not the state to which the transition is made is "ERROR" (step S203).

If it is determined that the state is "ERROR" (step S203: Yes), the test data generating unit 113 outputs the bits added so far as test data (step S207). If, on the other hand, it is determined that the state is not "ERROR" (step S203: No), the test data generating unit 113 makes the next transition in the selected combination, and adds bits corresponding to the transition to the test data (step S204).

The test data generating unit 113 then determines whether or not the state to which the transition is made is "ERROR" (step S205). If it is determined that the state is "ERROR" (step S205: Yes), the test data generating unit 113 outputs the bits added so far as test data (step S207). If, on the other hand, it is determined that the state is not "ERROR" (step S205: No), the test data generating unit 113 determines whether or not the state to which the transition is made is "END" (step S206). If it is determined that the state is "END" (step S206: Yes), the test data generating unit 113 outputs the bits added so far as test data (step S207). If, on the other hand, it is determined that the state is not "END" (step S206: No), the processing from step S204 is repeated.

As illustrated in FIG. 8, a test stream ID is assigned to each bit stream of the test data output as a result of the processing described above. The test stream IDs may be assigned according to the order of the output bit streams or may be assigned randomly after all the bit streams are output. Furthermore, bits of "0" are added to the generated test streams to compensate for missing bits as padding for adjusting the data length so that the bits are in units of bytes. This addition of padding may be performed when each stream is output by the test data generating unit 113 or may be performed by processing the test data at a different component.

Furthermore, as illustrated in FIG. 9, the test pattern is obtained by adding a value of normal stream/abnormal stream that is a determined value indicating whether or not a bit stream is an output resulting from a transition to the state of "ERROR", information on the XML format before encoding, information on the number of bits before padding, and the like to the generated test data. In this case, what is essential is the value of normal stream/abnormal stream. Accordingly, in the present embodiment, the test data generating unit 113 functions as a determined value generating unit that generates a determined value indicating whether a transition is a normal transition or a transition that is not defined by the XML schema by associating the transition with all the combinations of state transitions according to the encoding rule.

Figure 10:
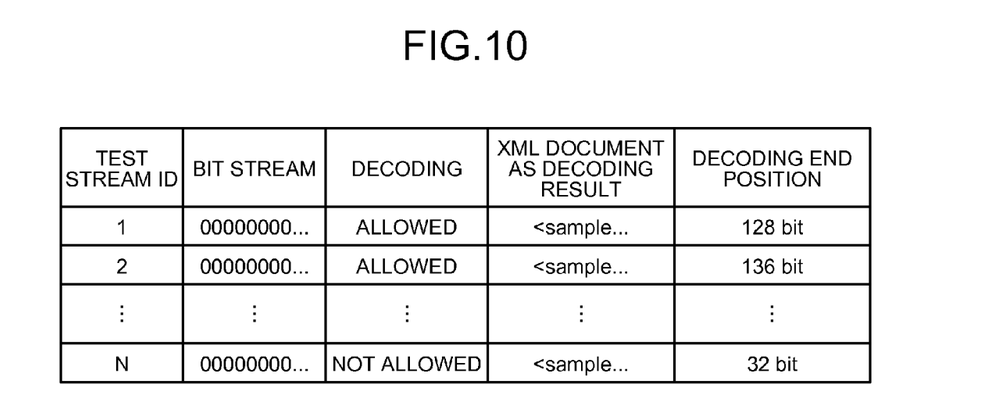
FIG. 10 is data obtained by decoding a test stream according to the first embodiment.

The generated test data are then input to the decoder 200, which in turn outputs a decoding result as illustrated in FIG. 10 as a result of decoding. The decoding result that is output includes, in addition to the same test stream ID as that of the input value and a bit stream, a value indicating whether or not decoding is allowed that is an output determined value for determining whether or not the result of decoding is a correct bit stream. Specifically, for a bit stream generated as a result of a state transition to "ERROR", it is assumed that a value of "not allowed" will be output.

The verifying unit 120 compares the output determined value input from the decoder 200 and the determined value contained in the test pattern, to which the same test stream ID is assigned, and determines whether or not the determined values match each other. Specifically, the verification of the decoder 200 is performed by verifying whether or not the decoder 200 recognizes and processes the bit stream generated as a result of a state transition to "ERROR" as an error and whether or not the decoder 200 recognizes and processes a normal bit stream as normal on the basis of both of the input values. If the input values match each other as a result of verification, the verifying unit 120 then outputs a verification result indicating that the operation of the decoder 200 is normal, and if the input values do not match each other, the verifying unit 120 then outputs a verification result indicating that the decoder 200 is abnormal in operation.

Alternatively, in addition to the verification method described above, another example of the method for verifying the decoder 200 may include setting the decoder 200 not to read a padding part out of an input bit stream, verifying whether or not the length of the bit stream before adding the padding and the data size of part of the bit stream analyzed by the decoder 200 match each other or whether or not the data size of the padding and the data size of part of the bit stream that is not analyzed by the decoder 200 match each other, and determining that the operation of the decoder 200 is correct if the data sizes match each other. Still alternatively, the decoder 200 may be verified by checking whether the data size of part as padding that is not analyzed is equal to or smaller than 8 bits, or by comparing an XML document before decoding and a decoded XML document.

As a result of adding an error rule as described above, test data of a combination of bits that may be added to the decoder 200 can be generated, and it is thus possible to verify not only that a correct output can be obtained in response to a correct input but also that an abnormal input is not erroneously recognized as normal and is processed as an abnormal input, which facilitates tests allowing the operation of the decoder 200 to be guaranteed.

Second Embodiment

Figure 13:
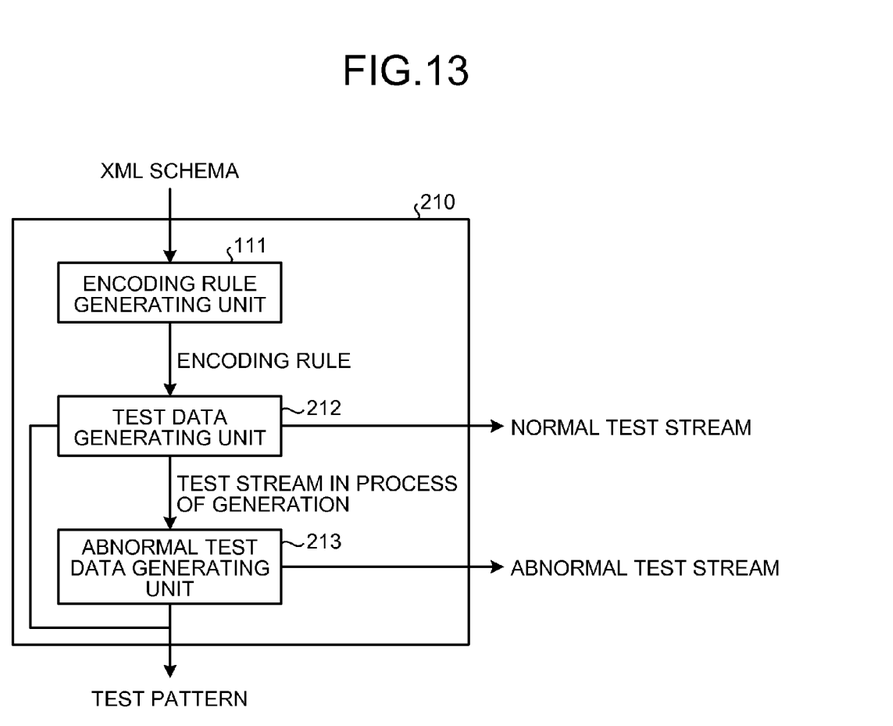
FIG. 13 is a block diagram illustrating details of a functional configuration of a verification device according to a second embodiment.

Next, a second embodiment of the verification device 100 will be described. FIG. 13 is a diagram illustrating a detailed configuration of a test pattern generating unit 210 according to the second embodiment. The test pattern generating unit 210 includes an encoding rule generating unit 111, a test data generating unit 212, and an abnormal test data generating unit 213. The encoding rule generating unit 111 is similar to that in the first embodiment.

Figure 14:
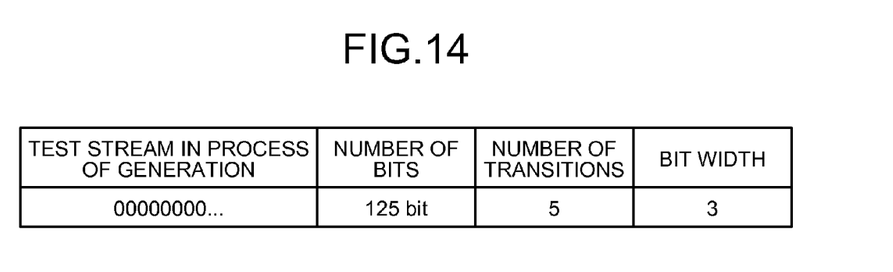
FIG. 14 is an example of information on generation of a test stream in the process of generation according to the second embodiment.

The test data generating unit 212 receives an encoding rule as input and outputs a normal test stream that is generated by following transitions according to the encoding rule, a test pattern, and a test stream that is in the process of generation. The normal test pattern is similar to the test data that can be generated in a state before an error rule is attached in the examples according to the first embodiment, and the test pattern is similar to that in the first embodiment. The test stream in the process of generation is generated each time one transition is made from a state in a certain combination of transitions, and input to the abnormal test data generating unit 213. FIG. 14 is an example of the test stream in the process of generation.

As illustrated in FIG. 14, a test stream in the process of generation contains, in addition to a bit stream, generation information such as the current number of bits, the number of transitions that can be made from the current state, and a bit width capable of expressing the number of transitions that can be made from the current state in a distinguishable manner. When the number of bits is not output, the current number of bits may not be included in the test pattern. Such a bit stream in the process of generation is input to the abnormal test data generating unit 213, and if it is determined that a test pattern that can be an error needs to be generated, the abnormal test data generating unit 213 performs processing for generating an abnormal test stream. In addition, a test pattern corresponding to the test stream that is an error is added to the test pattern generated by the test data generating unit 212. Note that all the test streams in the process of generation may be input to the abnormal test data generating unit 213, or only streams containing a state in which there is a difference between the number of transitions and the bit width in a selected combination of transitions during generation of a test stream may be output. Accordingly, although the test data generating unit 212 also serves as a generation information output unit in the present embodiment, a component for outputting only generation information on the basis of a test stream in the process of generation and the encoding rule may be provided.

Figure 15:
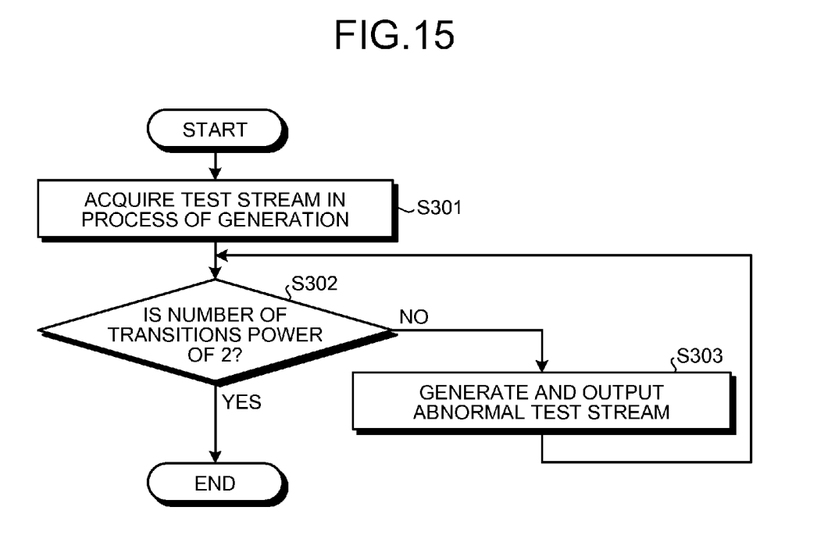
FIG. 15 is a flowchart illustrating a flow of processing for adding an error transition to state transitions in the verification device according to the second embodiment.

A flow of processing for generating an abnormal test stream will be described below with reference to the flowchart of FIG. 15. As illustrated in FIG. 15, the abnormal test data generating unit 213 first acquires an input test stream in the process of generation (step S301). Subsequently, the abnormal test data generating unit 213 determines whether or not the number of transitions in the generation information contained in the test stream in the process of generation is a power of 2 (step S302). If the number of transitions is a power of 2 (step S302: Yes), the processing is terminated. If, on the other hand, the number of transitions is not a power of 2 (step S302: No), bits corresponding to the number obtained by adding 1 to the current number of transitions are generated and added to the bit stream in the process of generation to generate an abnormal test stream (step S303). Since the number of transitions is incremented by 1 at this point, the processing returns to step S302 and subsequent processing is repeated. For example, in the case of the test stream in the process of generation illustrated in FIG. 14, the number of transitions is 5, and therefore an abnormal test stream obtained by adding 101 to the test stream in the process of generation, an abnormal test stream obtained by adding 110 to the test stream in the process of generation and an abnormal test stream obtained by adding 111 to the test stream in the process of generation are generated. The abnormal test streams are input to the decoder 200 and also added to the test pattern.

Thus, the abnormal test streams and the normal test streams are input together to the decoder 200, and subsequently, the verifying unit 120 can perform verification of the operation of the decoder 200 on the basis of an output determined value from the decoder 200 and a determined value of the test pattern similarly to the first embodiment.

The verification device 100 according to the present embodiment can determine whether or not to generate an abnormal test stream that is an error on the basis of the number of transitions in a test stream in the process of generation without generating an error rule in advance, and perform verification of the operation of the decoder 200 similarly to the first embodiment.

The verification device according to the embodiments described above includes a control device such as a CPU, a storage device such as a read only memory (ROM) and a random access memory (RAM), an external storage device such as an HDD and a CD drive, a display device such as a display, and an input device such as a key board and a mouse, which is a hardware configuration utilizing a common computer system.

Verification programs to be executed by the verification device according to the embodiments described above are recorded on a computer readable recording medium such as a CD-ROM, a flexible disk (FD), a CD-R, and a digital versatile disk (DVD) in a form of a file that can be installed or executed, and provided as a computer program product.

Alternatively, the verification programs in the embodiments described above may be stored on a computer system connected to a network such as the Internet, and provided as a computer program product by being downloaded via the network. Still alternatively, the verification programs to be executed by the verification device according to the embodiments described above may be provided or distributed as a computer program product through a network such as the Internet.

Still alternatively, the verification programs in the embodiments described above may be embedded on a ROM or the like in advance and provided as a computer program product.

The verification programs to be executed by the verification device according to the embodiments described above have a modular structure including the respective units (test pattern generating unit, verifying unit) described above. In an actual hardware configuration, a CPU (processor) reads the verification programs from the storage medium mentioned above and executes the programs, whereby the respective units are loaded on a main storage device and the test pattern generating unit and the verifying unit are generated thereon.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A verification device comprising:
   a receiving unit configured to receive an input of a definition document that defines a grammar of a structured document;
   an encoding rule generating unit configured to generate an encoding rule based on the received definition document, the encoding rule defining state transitions used for encoding the structured document into binary data;
   a test data generating unit configured to generate test data in which all combinations of the state transitions are expressed in bits in accordance with the encoding rule, the test data being to be input to a decoding device that decodes the encoded structured document;

an error rule generating unit configured to add an error rule to the encoding rule when there is a difference between the number of state transitions and a maximum number that is expressed by the number of bits necessary for expressing the number of transitions, the error rule corresponding to the difference;
a determined value generating unit configured to generate a determined value that indicates whether a transition is a normal transition or an abnormal transition for each of the combinations of the state transitions, in accordance with the encoding rule; and
a verifying unit configured to
compare the determined value with an output determined value for the combination of the state transitions corresponding to the determined value, the output determined value resulting from inputting the test data to the decoding device and indicating whether a transition is a normal transition or an abnormal transition, and
determine that the decoding device is not normal when the determined value and the output determined value and are different from each other.

2. The verification device according to claim 1, wherein the test data generating unit adds padding for adjusting a data length of the test data and outputs the data length before addition of the padding to the verifying unit,
the verifying unit receives as input a read bit position when the test data are decoded from the decoding device, and
the verifying unit compares the determined value and the output determined value, and determines that the decoding device is not normal when the determined value and the output determined value are different from each other or when the data length and the read bit position are inconsistent.

3. The verification device according to claim 1, wherein the test data generating unit adds padding for adjusting a data length of the test data and outputs a data size of the padding to the verifying unit,
the verifying unit receives as input an unread bit position when the test data are decoded from the decoding device, and
the verifying unit compares the determined value and the output determined value, and determines that the decoding device is not normal when the determined value and the output determined value are different from each other or when the data size and the unread bit position are inconsistent.

4. A verification device comprising:
a receiving unit configured to receive an input of a definition document that defines a grammar of a structured document;
an encoding rule generating unit configured to generate an encoding rule based on the received definition document, the encoding rule defining state transitions used for encoding the structured document into binary data;
a test data generating unit configured to generate test data in which all combinations of the state transitions are expressed in bits in accordance with the encoding rule, the test data being to be input to a decoding device that decodes the encoded structured document;
a generation information output unit configured to output generation information that contains the number of transitions allowable from a state transition of the test data, and in-process test data in which bits in a process of generation are added to the test data each time the bits corresponding to the state generations are added to the test data;
an abnormal test data generating unit configured to generate abnormal test data by adding an error bit indicating that the test data is abnormal data to the in-process test data when there is a difference between the number of state transitions and a maximum number that is expressed by the number of bits necessary for expressing the number of transitions;
a determined value generating unit configured to generate a determined value that indicates whether a transition is a normal transition or an abnormal transition for each of the combinations of the state transitions, in accordance with the encoding rule; and
a verifying unit configured to
compare the determined value with an output determined value for the combination of the state transitions corresponding to the determined value, the output determined value resulting from inputting the test data and the abnormal test data to the decoding device and indicating whether a transition is a normal transition or an abnormal transition, and
determine that the decoding device is not normal when the determined value and the output determined value and are different from each other.

5. The verification device according to claim 4, wherein the test data generating unit adds padding for adjusting a data length of the test data and outputs the data length before addition of the padding to the verifying unit,
the verifying unit receives as input a read bit position when the test data are decoded from the decoding device, and
the verifying unit compares the determined value and the output determined value, and determines that the decoding device is not normal when the determined value and the output determined value are different from each other or when the data length and the read bit position are inconsistent.

6. The verification device according to claim 4, wherein the test data generating unit adds padding for adjusting a data length of the test data and outputs a data size of the padding to the verifying unit,
the verifying unit receives as input an unread bit position when the test data are decoded from the decoding device, and
the verifying unit compares the determined value and the output determined value, and determines that the decoding device is not normal when the determined value and the output determined value are different from each other or when the data size and the unread bit position are inconsistent.

7. A verification method comprising:
receiving an input of a definition document that defines a grammar of a structured document;
generating an encoding rule based on the received definition document, the encoding rule defining state transitions used for encoding the structured document into binary data;
adding an error rule to the encoding rule when there is a difference between the number of state transitions and a maximum number that is expressed by the number of bits necessary for expressing the number of transitions, the error rule corresponding to the difference;
generating test data in which all combinations of the state transitions are expressed in bits in accordance with the encoding rule, the test data being to be input to a decoding device that decodes the encoded structured document;
generating a determined value that indicates whether a transition is a normal transition or an abnormal transition for each of the combinations of the state transitions, in accordance with the encoding rule;

comparing the determined value with an output determined value for the combination of the state transitions corresponding to the determined value, the output determined value resulting from inputting the test data to the decoding device and indicating whether a transition is a normal transition or an abnormal transition, and determining that the decoding device is not normal when the determined value and the output determined value and are different from each other.

8. A computer program product comprising a computer-readable medium containing a program executed by a computer, the program causing the computer to execute:

receiving an input of a definition document that defines a grammar of a structured document;

generating an encoding rule based on the received definition document, the encoding rule defining state transitions used for encoding the structured document into binary data;

adding an error rule to the encoding rule when there is a difference between the number of state transitions and a maximum number that is expressed by the number of bits necessary for expressing the number of transitions, the error rule corresponding to the difference;

generating test data in which all combinations of the state transitions are expressed in bits in accordance with the encoding rule, the test data being to be input to a decoding device that decodes the encoded structured document;

generating a determined value that indicates whether a transition is a normal transition or an abnormal transition for each of the combinations of the state transitions, in accordance with the encoding rule;

comparing the determined value with an output determined value for the combination of the state transitions corresponding to the determined value, the output determined value resulting from inputting the test data to the decoding device and indicating whether a transition is a normal transition or an abnormal transition, and determining that the decoding device is not normal when the determined value and the output determined value and are different from each other.

\* \* \* \* \*